United States Patent [19]

Hendry et al.

[11] 3,979,762

[45] Sept. 7, 1976

[54] MODULAR PHOTOGRAPHIC SYSTEM

[75] Inventors: Donald H. Hendry, Rockland; Andrew S. Ivester, Charlestown; Bruce K. Johnson, Andover, all of Mass.

[73] Assignee: Polaroid Corporation, Cambridge, Mass.

[22] Filed: Mar. 3, 1975

[21] Appl. No.: 554,770

[52] U.S. Cl. .............................. 354/288; 354/83; 354/86
[51] Int. Cl.² ........................................ G03B 17/02
[58] Field of Search ................ 354/64, 83, 86, 219, 354/288, 354; 206/316

[56] References Cited
UNITED STATES PATENTS

| | | | |
|---|---|---|---|
| 2,323,009 | 6/1943 | Claudot et al. | 354/288 |
| 2,484,510 | 10/1949 | Hutchison et al. | 354/288 |
| 3,266,396 | 8/1966 | Padelt | 354/288 |
| 3,441,072 | 4/1969 | Schmitt | 354/288 |
| 3,519,162 | 7/1970 | Peterson et al. | 354/288 |
| 3,774,516 | 11/1973 | Burgarella et al. | 354/288 |
| 3,777,639 | 12/1973 | Lange | 354/288 |

Primary Examiner—L. T. Hix
Assistant Examiner—Russell E. Adams, Jr.
Attorney, Agent, or Firm—Francis J. Caufield

[57] ABSTRACT

A modular photographic system that performs a series of operating functions attendant to the consecutive exposure and processing of a cassette of self-processable film units. The system construction includes a body and front cover member which cooperate to form a protective enclosure for a system assembly that provides the system operating functions independent of the enclosing structure, The system assembly is formed by attaching a series of function-providing modules to a primary structural member that supports each of the modules in interfacing relationship while simultaneously defining the system exposure chamber. The body includes an internal chamber that is adapted to slidably receive the system assembly to support and position it such that the structural interfaces between the two form a cassette receiving chamber. The front cover member fastens to the body with snap-type connectors to retain the system assembly within the body chamber and complete the enclosing structure.

37 Claims, 10 Drawing Figures

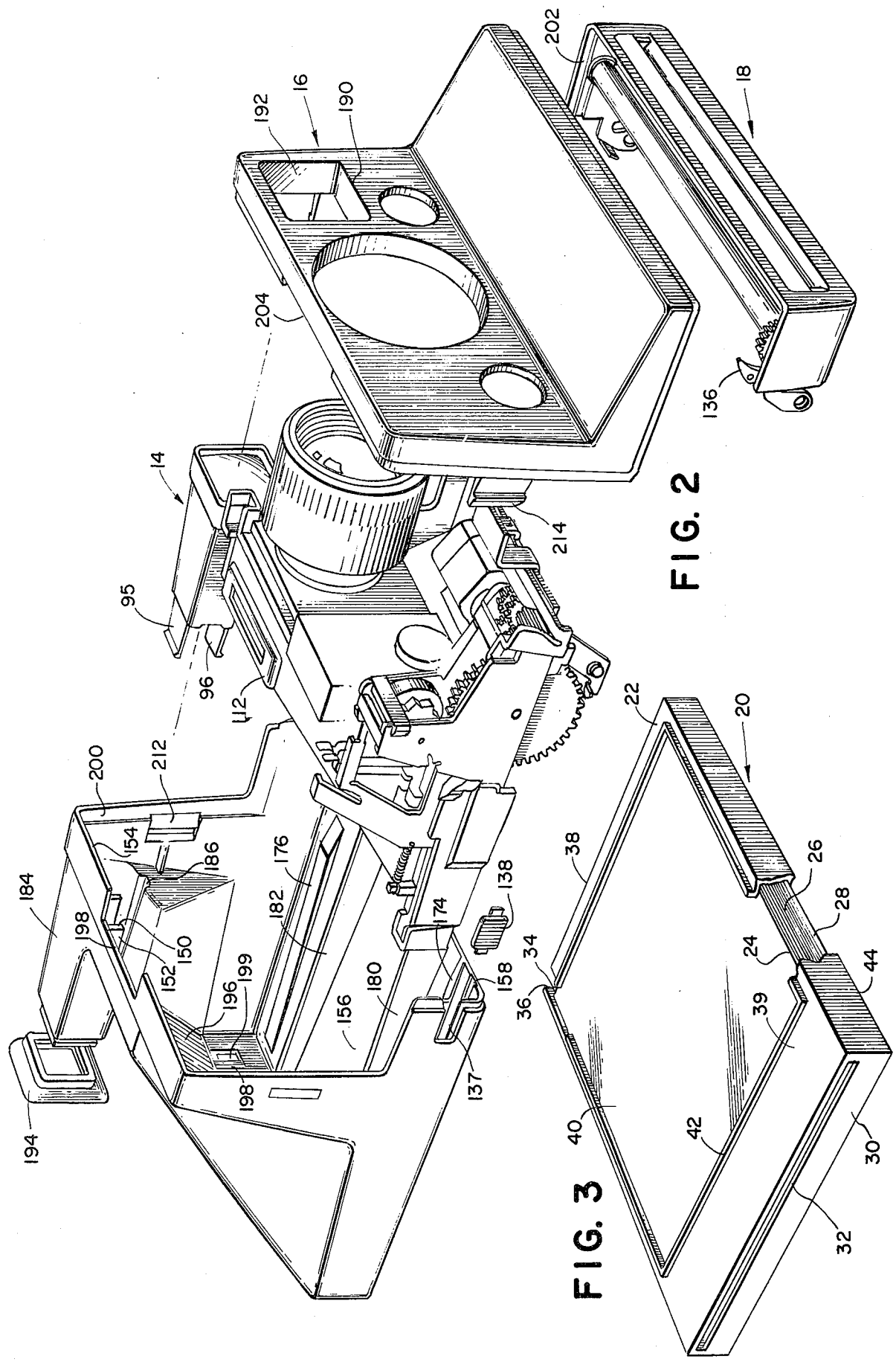

MODULAR PHOTOGRAPHIC SYSTEM

CROSS REFERENCE TO RELATED APPLICATION

This application is related to copending application Ser. No. 554,769 filed concurrently herewith and entitled "Modular Photographic System Assembly."

BACKGROUND OF THE INVENTION

1. Field of the Invention

This invention relates to photography and, more particularly, to a modular photographic system.

2. Description of the Prior Art

Early cameras were comparatively large, yet quite simple, devices constructed of brass-reinforced hard woods and leather bellows. Because of the prevalence of large photographic plates and small apertures, the tolerances they demanded could be easily satisfied by craftsmen using hand fabrication techniques. However, this situation changed rapidly with the development of fast roll films and larger aperture lenses. Suddenly, smaller cameras became possible. This reduction in camera size created a new potential market — the amateur photographer. The influence of the amateur in camera design was immediate; cameras now had to be convenient, reliable and inexpensive. Coupled with the ever present need for good optical and technical quality pictures, these new demands transformed the forgiving box camera into a miniature highly complex instrument that had to be built with extremely precise tolerances. Fabrication by hand soon became prohibitively expensive. To keep the prices at a reasonable level, camera manufacturers responded by turning their attention to the development of mass production capability using high speed assembly machinery. Providing such high speed assembly machinery, however, is relatively expensive and does add to the camera cost even, when its cost can be distributed over a large production output. In addition, such machinery itself is inherently complex requiring a considerable design and development effort which must ultimately be coordinated with the camera design. Other problems associated with such machinery include its maintenance, repair and replacement. There are also subtle labor inefficiencies connected with such production machinery. It takes longer to fixture parts and assemble them than it would if they could be assembled just by hand. The setup time involved in mounting parts on and off production machinery can obviously be significant. Scrap losses as a result of improper assembly can also have a significant impact on final prices.

These problems become intensified as camera complexity increases. This is especially true of the most contemporary cameras. These are very complex and should, in fact, be characterized as photographic systems because of all the tasks they are called upon to perform. Their designers must display a great deal of imagination and technical ability if they hope to create a successful product that can compete in todays market. Todays design, therefore, must not only satisfy the technical requirements but must also account for and deal with the related manufacturing problems similar to those previously discussed.

The present invention deals with the problems associated with the manufacture of the modern photographic system in a most direct way. In effect, it substantially eliminates the need for assembly machinery and conventional fasteners while still meeting the high tolerance requirements demanded of the modern photographic system. Unlike the prior art it can be assembled into final form with virtually no tools.

SUMMARY OF THE INVENTION

The preferred embodiment of the present invention is depicted as a modular photographic system that performs a series of system operating functions attendant to the consecutive exposure of a plurality of self-processable film units.

The modular concept of construction has been applied to the design of the system in order to simplify its manufacture, testing and repair. Emphasis has been placed on the structural arrangement of the various components of the system and the way in which they fit together in order to minimize the manufacturing costs of the system and to provide a system whose performance can be verified prior to its final assembly. This is achieved by a design scheme that separates the various system operating functions by assigning their performance to discrete operating modules or structure. These functions are combined to accomplish the system's primary task by assembling the modules to supporting structure that establishes the interfacing of the modules one to another. The modules and structure connect with one another through the use of snap-type fasteners. Through the use of the design technique of separating system functions and recombining them with snap-together assembly fasteners, the need for expensive assembly machinery, conventional fasteners and labor costs associated with conventional fastening operations has been virtually eliminated.

In particular, the preferred embodiment includes a body and front cover member which mate with other to form a protective enclosure that shrouds a system assembly which provides the system operating functions independent of the enclosing structure formed by the body and front cover member. The body and front cover member are mated through the use of snap-type connectors after the system assembly has been inserted into the body. In this connection, the body includes an internal chamber that is adapted to slidably receive the system assembly and support it such that the structural interfaces between the two form a cassette receiving chamber internal to the enclosing structure. The front cover member, once connected to the body, retains the system assembly within the body chamber and completes the enclosing structure so that the exterior structure or surfaces of the body and front cover member protect the system assembly and define the aesthetic appearance of the system.

The system assembly is constructed by attaching a group of function-providing modules to a primary structural member that supports each of the modules in interfacing relationship while simultaneously defining the system exposure chamber.

Accordingly, it is an object of the invention to provide a modular photographic system that may be assembled without the use of conventional fasteners and complex assembly machinery.

Another object of the invention is to provide a photographic system that may be easily tested during its manufacture.

Yet another object of the invention is to provide a photographic system which may be relatively easily disassembled for repair only with specialized tools.

BRIEF DESCRIPTION OF THE DRAWINGS

The novel features that are considered characteristic of the invention are set forth in the appended claims. The invention itself, however, both as to its organization and its method of operation, together with additional objects and advantages thereof, will best be understood from the following description when read in connection with the accompanying drawings wherein like numbers have been employed in the different figures to denote the same parts and wherein:

FIG. 2 is a partially exploded diagrammatic perspective view of the system of FIG. 1 illustrating an operational system assembly of the system including a group of system modules;

FIG. 3 is a diagrammatic perspective view, with parts broken away, of a film cassette utilized with the system of FIG. 1;

DESCRIPTION OF THE PREFERRED EMBODIMENT

Figure 1:
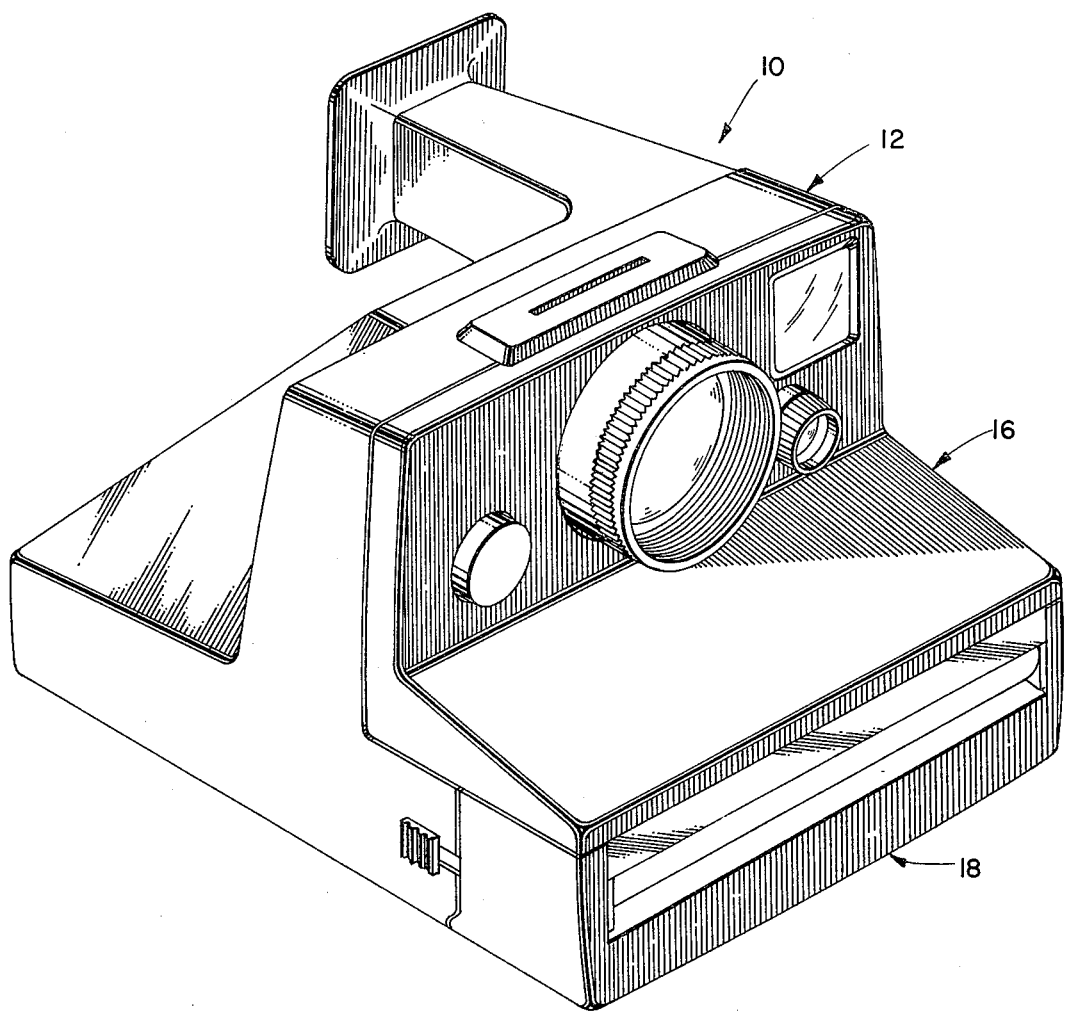
FIG. 1 is a diagrammatic perspective of a preferred embodiment of the system.

Changes in technology are received with some ambivalence by corporations whose products are consumer oriented. On the one hand, technological innovation is welcomed because it provides the basis for the new products that are necessary for the growth and survival of these corporations, and on the other hand, it is met with hostility because it threatens to displace or preempt their existing product lines thereby destroying their profits and market position. Even if a particular corporation is the originator of the innovation, it has no guarantee that it will dominate the market since it must be able to translate the innovation into a new product that satisfies sound business criteria. Over simplified, this means that the new product must be a high quality, low cost item that reaches the market before a competitor has an opportunity to establish a more favorable market position. Accomplishing this is not always an easy task. Because the amount of time and money required to design and develop a new product is directly proportional to the technical sophistication of the product and the degree to which familiar materials and fabrication techniques may be used to manufacture it, it is obvious that a corporation must not only have the technical capability of incorporating an innovation into its product line, but it must also have the financial capability of underwriting the capital investments in manufacturing machinery and facilities necessary to build it.

Corporations involved in the manufacture and sale of amateur camera products are obviously not immune from the foregoing considerations. Advances in photographic technology have provided the stimulus for the evolution of the camera from the simple box-type to the modern rather complex sophisticated photographic system. At each stage in the development of the camera, photographically oriented corporations that have been able to respond to the changes have survived. Conversely, those that have not are no longer viable. The difference between survival and extinction, however, has not always been based solely on a corporation's ability to assimilate the technological change, but very often on its financial flexibility. Some corporations, while perfectly capable of designing a new product, are not able to make the capital investment necessary to bring it to the consumer. To the extent that the introduction of new photographic systems may be impeded by this latter problem, i.e., insufficient investment capital, the present invention represents a direct solution by providing the art with a camera construction that facilitates manufacture without the need for the relatively expensive assembly equipment that is usually associated with traditionally designed photographic systems. In effect, the function of the assembly equipment has been eliminated in this design by incorporating it in the various parts that comprise the system. As will subsequently be seen, this has been accomplished by analyzing the overall system task by first breaking it down into specific functions. Components were then selected and grouped into functional boxes or modules to satisfy the various operating functions that were identified. These modules were then provided with a structural nucleus in the form of a plastic integrally molded member that unified the modules into a cooperative whole to accomplish the overall task, producing a finished picture automatically. The entire system may be hand assembled because each component includes, as an integral part thereof, snap fasteners. The modular assembly concept, as well as facilitating assembly, also expedites repair and reduces scrap losses by permitting more efficient testing during the progressive stages of assembly.

The invention, in its preferred embodiment, is depicted as a fully automatic rigid photographic system designated as 10 in FIG. 1. Referring to FIG. 2, which shows the system 10 just prior to its final assembly, it can be seen that the system 10 includes four major sections; namely, a body 12, a central system assembly 14, a front cover 16, and a door housing 18. The assembly of system 10 into its state shown in FIG. 1 is accomplished by simply attaching the door housing 18 to the system assembly 14 and then sliding this combination into the body 12 until it seats. The front cover 16 then snaps to the body 12 to completely enclose the assembly 14 within a protective envelope formed by the exterior portions of the body 12, the front cover 16, and the door housing 18. This may be done completely by hand without the use of any specialized tools. The exact details of the nature and mode of cooperation of each one of these for major sections that permit this method of assembly are obviously central to the understanding of the invention.

Because the system 10 is designed to perform a series of system operating functions attendant to the consecutive exposure and processing of a plurality of self-processable film units contained in a cassette, a logical starting point for beginning the description of the system 10 is to first describe the type of cassette with which it will be used. There are several good reasons for doing this. First, the cassette geometry and spatial arrangement of its various components will illustrate the various operations that need to be performed on it in order to produce a finished picture. Second, familiarity with the geometric configuration of the cassette will be useful in understanding the particular spatial arrangement of the various components that comprise the system 10. Third, it is useful to view the cassette as the workpiece upon which the system 10 performs its various operations. Lastly, and perhaps most importantly, various parts of the cassette can be considered to be the primary spatial datums to which the various components are oriented. Consequently, reference is now made to FIG. 3 wherein is shown a film cassette 20 of the general type adapted for use with the system 10.

The film cassette 20 is of the general type described in considerable detail in, for example, U.S. Pat. Nos. 3,651,746, issued on Mar. 28, 1972; and 3,705,542, issued on Dec. 12, 1972. Each of these patents basically describe photographic film assemblages which comprise a housing, an opaque light shield or dark slide, and a plurality of film units, preferably of the self-processable type, arranged in stacked relationship, and adapted to be exposed and then automatically withdrawn from the housing and processed in a consecutive fashion. Also included within the cassette is a flat thin battery that supplies electrical energy for operating various components of a system with which the cassette is used. Focusing on FIG. 3, it can be seen that the cassette 20 includes these elements. More specifically, the cassette 20 comprises a box-like plastic injected molded housing 22 in which are arranged, in stacked relationship, a protective dark slide 24 which provides a temporary light seal until it is removed, a plurality of photosensitive self-processable film units 26, a spring like platen (not shown) for urging the film units 26 into position for exposure, and a flat thin battery 28. At a front wall 30 of the housing 22 is located an elongated exit slot 32 through which the aforementioned sheet-like members, i.e., the dark slike 24 and the film units 26, are adapted to be advanced. Advancement of these sheet-like members through the exit slot 32 is accomplished by a film advance mechanism which may be of the type shown in detail in U.S. Pat. No. 3,753,392 entitled "Film Advancing Apparatus." Briefly, a film pick member selectively engages, on programmed signal, a trailing edge 34 of a forwardmost sheet member through a pick access slot 36 located in a rear wall 38 of the housing 22 and provides a pushing force that moves such an engaged sheet member toward and through the exit slot 32. After moving through the exit slot 32, a sheet member is then usually further advanced, and in the case of a film unit, processed by a pair of rotating juxtaposed rollers that are generally positioned to receive the sheet member.

A top wall section 39 of the housing 22 is provided with an exposure aperture 40 whose edges are surrounded with a raised flange 42 that define the limits of the exposure area and also provide a structural means that facilitates locating the cassette 20 within an exposure plane, not presently visible but contained within the assembly 14. A bottom wall 44 includes a pair of spaced apart access holes (not shown) that are adapted to receive a pair of battery contacts, designated as 110 in FIG. 4, which are also a part of the system assembly 14.

The geometric configurations of the cassette 20 and the physical arrangement of its various components obviously impose certain spatial design constraints on any apparatus with which it is to be used. In addition to being geometrically compatable with the cassette 20, the particular apparatus with which it will be used, whatever its form, must also provide certain operating functions that will satisfy the ultimate task of automatically producing a finished picture. In this respect, it is useful to think of these operating functions in terms of two broadly generalized categories. The first may be termed the traditional category which embraces all of those functions that are common to all photographic systems. One way to illustrate this category of functions is to recall the conventional definition of a camera. By definition, a camera is a device for making a record of the image of an object formed when rays of light pass through a lens and fall on a flat surface, the film plane. The camera's essential parts include an exposure chamber into which the light rays can only be admitted by a lens, when a shutter is opened, to form an image in a photosensitive material such as one of the film units 26. The other category of functions would include all of those functions normally associated with fully automated photographic systems. Included here would be all of those functions that a user would normally perform in a conventional photographic process but does not in a fully automatic system. By way of example, these would include automatic exposure control, film advance, and film processing. In the fully automatic system then, the user simply loads the film cassette, such as the cassette 20, focuses the camera, frames his subject of interest and presses a system initiating button. The system does the rest. It is understandable how these automated systems can become complex in nature and rather difficult to economically manufacture. In the instant invention, all of these functions, in both categories, are satisfied by the system assembly 14. To define the structural manifestations of all of these functions, reference will now be made to FIG. 4.

Figure 4:
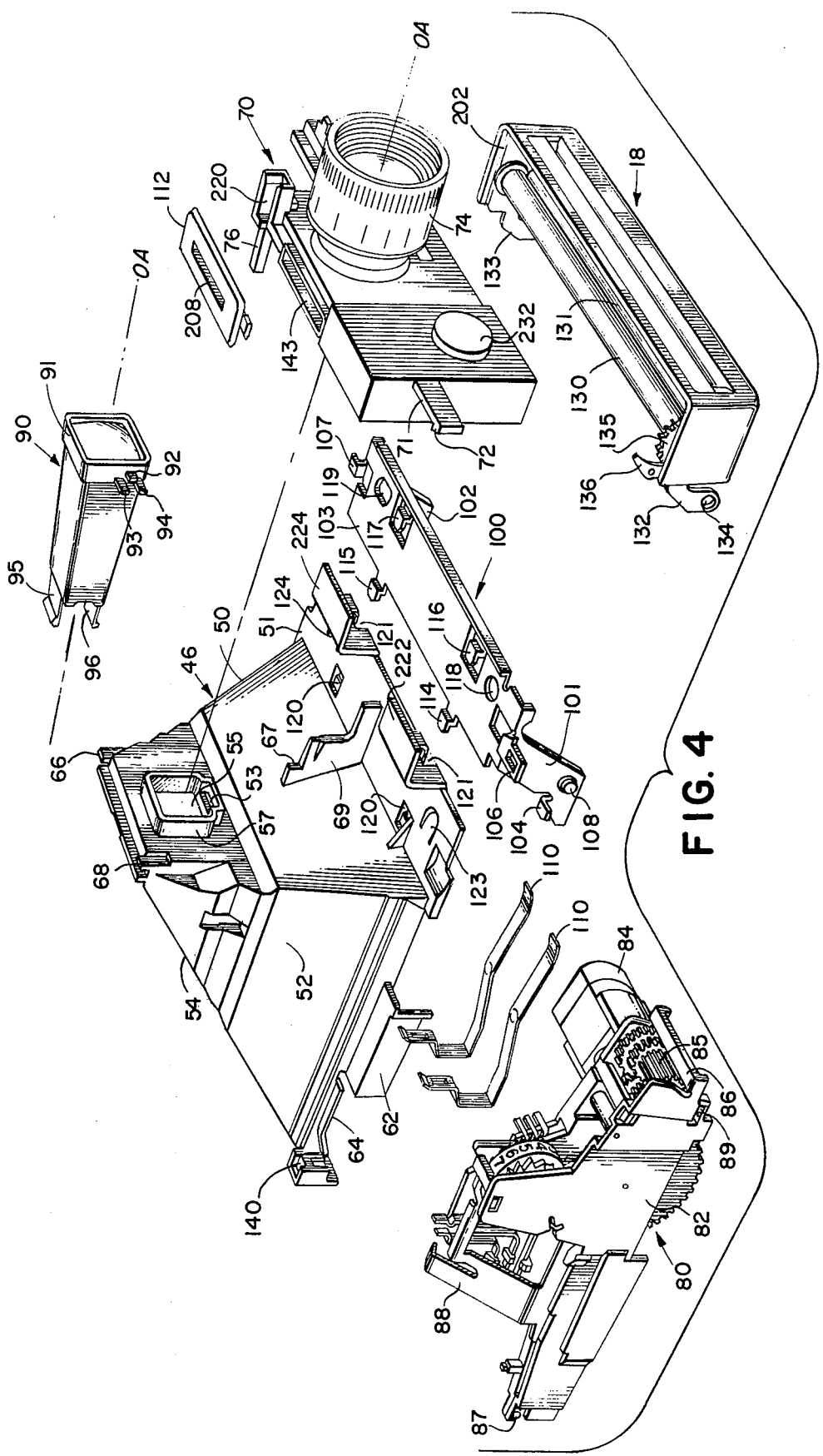
FIG. 4 is an exploded diagrammatic perspective of an independently operational system assembly illustrating a plurality of system function providing modules and their supporting structure.

In FIG. 4, which is an exploded diagrammatic perspective of the central system assembly 14, a group of function providing modules and components are seen surrounding a structural member 46 that dominates the center of the illustration. Structural member 46 is of considerable importance to the invention because of the variety of functions it provides, and the way in which it provides them. Among these functions are: (1) It defines the film plane; (2) it forms the system exposure chamber; (3) it establishes the dimensional relationship between the film plane and the system optics; (4) it supports and spatially positions all of the system function providing modules with respect to the film plane and each other; and (5) it locates the cassette with respect to the film plane and the modules acting on it. In summary, structural member 46 serves as the structural nucleus or primary building block of the system 10. What is unusual about it is the fact that it provides all these functions in a single unitary piece. Normally, these functions are supplied, in traditional camera designs, by joining two or more, or even several separate structures together through the use of conventional fasteners using locating jigs and fixtures. The advantages of integrating all of these into the structural member 46 are manifest. Assembly errors due to tolerance variations in individual piece parts are substantially eliminated. Also not present are the performance related problems that also are influenced by variations in piece parts. Fewer parts are required and hence cost is decreased. The various modules that attach to it are atuomatically located, thereby substantially eliminating the need for locating jigs.

Because structural member 46 incorporates all of these functions in a single part, it includes much detail that will have to be examined rather closely. The first aspect that will be considered though is its general construction.

Figure 5:
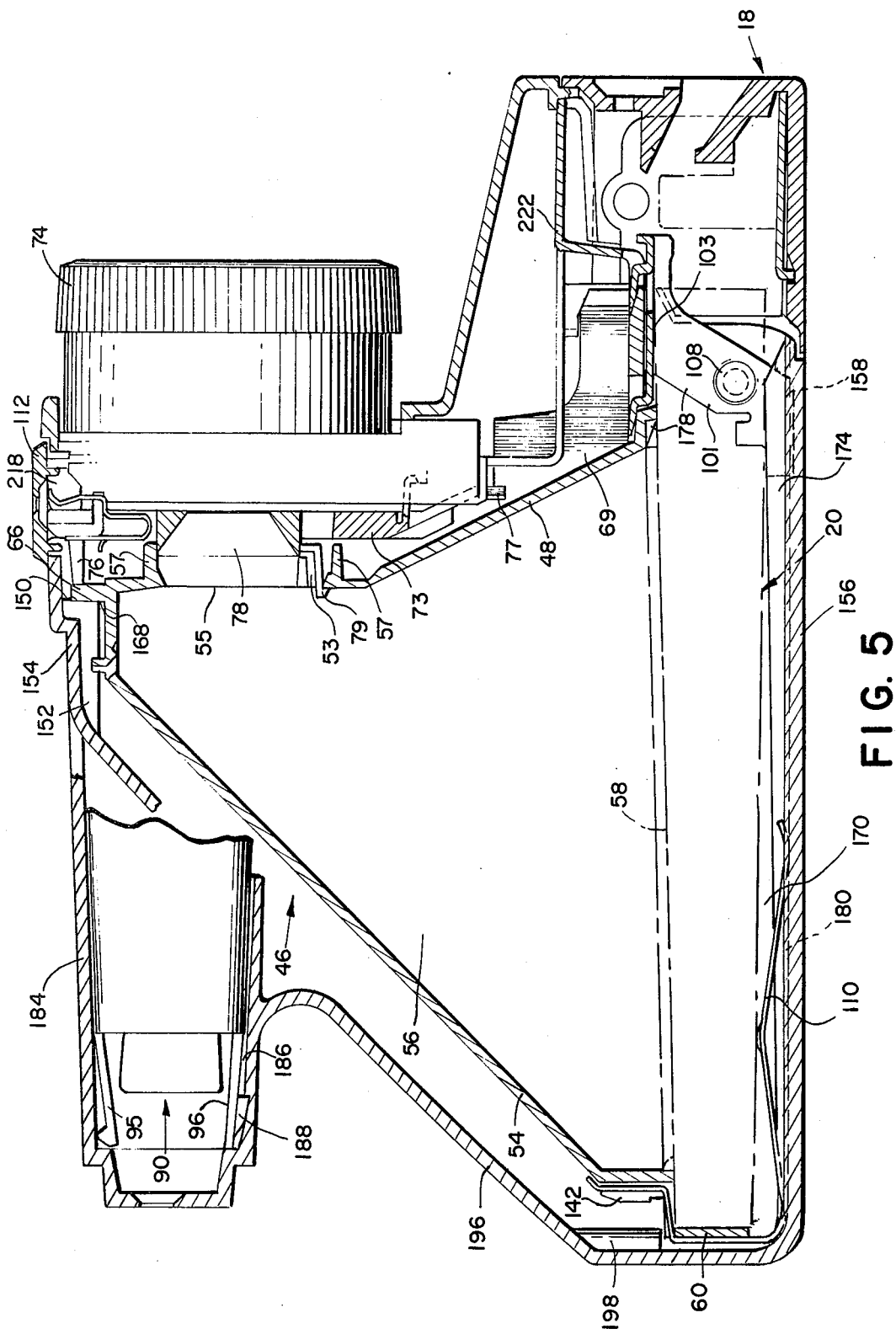
FIG. 5 is a side elevational view, with parts broken away, of the system of FIG. 1 illustrating an operational system assembly disposed within an enclosure formed by a body and front cover member of the system of FIG. 1.

Structural member 46 preferably is an integrally molded, thin walled, opaque plastic piece produced through injection molding techniques. It includes a front wall section 48, left and right side wall sections, 50 and 52 respectively, and a rear wall section 54. The interior portions of these wall sections form an exposure chamber 56 as shown in FIG. 5. The exterior portions, stated generally, include portions adapted to uniquely engage and mate with preselected ones of the various modules. Specific details of these connections will subsequently be discussed. For the present, however, attention will be directed to describing how the film plane is formed since it serves as the primary datum of the system.

One notices that the geometric shape of the structural member 46 is similar to that of a hollow pyramid having the exposure chamber 56 for an interior. Corresponding to the base of the pyramid, there is a plane 58 (FIG. 5) defined by the bottom edges of the wall sections 48, 50, 52 and 54 of the structural member 46. The bottom edges of said wall sections define a surface against which the cassette 20 is supported in position for exposure. In addition, they define a rectangular aperture that is dimensioned to telescopically receive the vertically extending flange 42 of the cassette 20 so as to locate the cassette 20 in proper relationship to the other system components. One can now imagine the cassette 20 located with its flange 42 mated with a correspondingly configured aperture formed in the base of the structural member 46 and having its top wall section 39 in contact with the plane 58. In order to insure that the cassette 20 retains this ideal position, the structural member 46 includes additional locating structure. Referring to FIG. 5, there can be seen a vertical downwardly extending apron 60 which continues the rear wall 54. This apron 60 serves as a stop against which the rear wall 38 of the cassette 20 seats thereby locating the cassette 20 in a front to rear attitude. Referring to FIG. 4, there can be seen another apron 62 which extends from the right side wall 52 of the structural member 46. Apron 62 serves as a stop to laterally locate the cassette 20. There is a similar apron (not shown) extending from the left side wall 46 that includes suitable means for continuously urging the cassette 20 against the right apron 62. With this arrangement the pick access slot 36 of the cassette 20 is guaranteed to be properly located in a three dimensional position in readiness to receive a pick of the type previously referred to. In this connection, there is a pick recess area 64 designed to permit such a pick to engage one of the film units 26.

Figure 6:
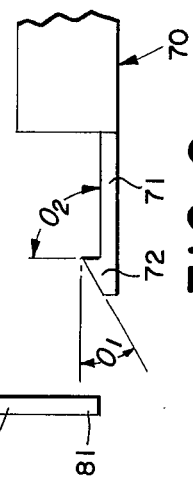
FIG. 6 is a diagrammatic top view of a typical snap-type fastener employed in the system of FIG. 1.

Referring to FIG. 4 again, it can be seen that the central assembly 14 further includes a shutter module 70, a gear train module 80, a viewfinder module 90, a mounting bracket 100, a pair of battery contacts 110, a flash socket bonnet 112, and the door housing 18, previously mentioned. By way of introductory comment, it can be stated generally that each one of these modules or components, with the possible exception of module 90, attaches to the structural member 46 and-/or each other with snap together type connectors in such a way that each is accurately positioned, in three dimensional space, with respect to the plane 58 and each other. Since many of the snap connections possess the same general construction, it will be convenient to discuss a representative one to illustrate their general principle of operation. For example, shutter module 70 has a laterally extending cantilevered member 71 which engages with a section 81 located on a side plate 82 of the gear train module 80. In FIG. 6 is seen a schematic top view of the side plate 82 and the cantilevered member 71 prior to their engagement with each other. The cantilevered member 71 is seen to include a lug section 72 having a lead angle designated as $\theta_1$ and a return angle designated as $\theta_2$. As the member 71 is brought into contact with the edge of the plate 82, it is deflected as a result of the lead angle $\theta_1$ and passes through a stressed condition during which energy is stored in it. When this energy is released, the member 71 returns to a lower stress state and the mating parts are connected. The angles $\theta_1$ and $\theta_2$ can be selected so the amount of deflection can be limited so that the cantilevered member 71 will not be overstressed. This particular type of snap fastener has the advantage of being able to be disassembled without destroying it, if it is not overstressed. This construction is the general choice for most of the snap fasteners in the present invention since special tools can be supplied which will insure that the snap connectors won't be so overstressed during disassembly. This obviously means that the system 10 can be easily assembled but is relatively difficult to disassemble without the proper tools. This scheme coupled with the modular concept permits rather easy repair. Whenever reference is made to similar cantilevered type connectors, it will be understood that they operate in the same general way.

Figure 7:
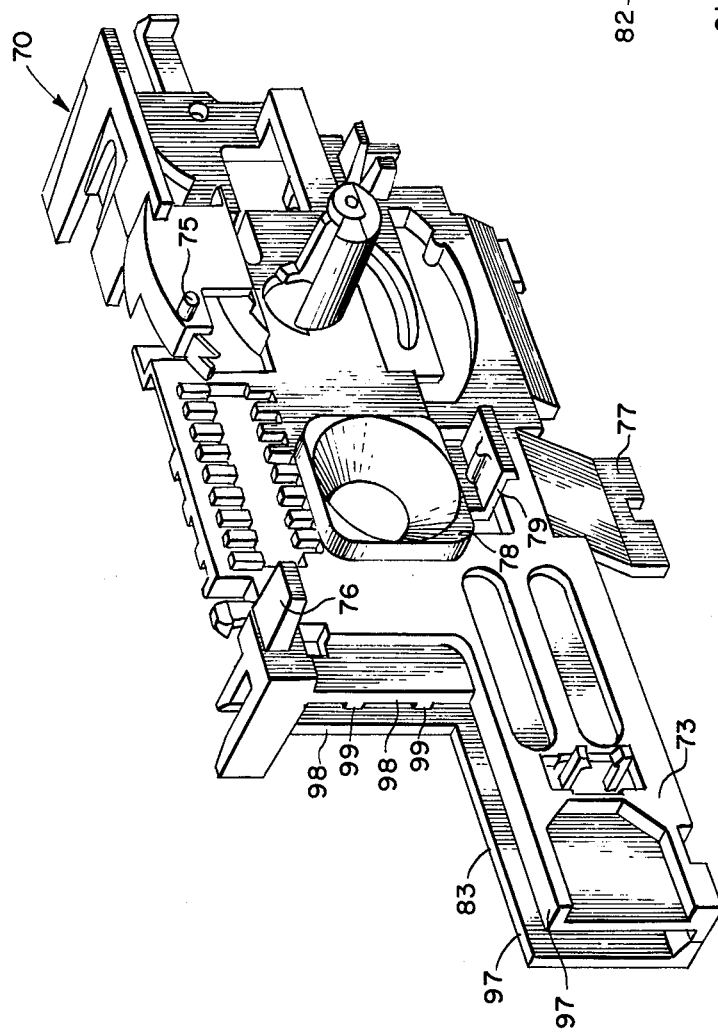
FIG. 7 is a diagrammatic rear perspective view, with parts deleted, of a shutter module that forms part of the operational system assembly of FIG. 4.

The specifics relating to the interfacing of the various modules and components with the structural member 46 and each other will now be taken up by referring to FIG. 4 and other figures as indicated. Shutter module 70 snaps onto the front wall 48 of the structural member 46 and is located thereon by a three point positioning arrangement. In this respect there are three points on the front wall 48 that contact three corresponding points on a rear wall section 73 (See FIG. 7) of the shutter module 70. This three point system establishes a plane which orients the shutter module 70 with respect to the plane 58 in order to insure proper alignment of an objective lens assembly 74 which forms part of the shutter module 70. The three points on the front wall 48 are established by the front surfaces of two vertically extending tab sections 66 and 68 respectively, and a front surface 67, also vertically extending, of a central vertical stiffening rib 69 that connects the front wall 48 to a forwardly extending horizontal shelf 51. The three points on the rear wall 73 of the shutter module 70 (See FIG. 7) are the back surfaces of a rearwardly extending cylindrical boss 75, a rearwardly extending tab 76, and the back surface of a notched tab section 77. The notch in the tab section 77 also slides over the central stiffening rib 69 to aid in preventing rotation of the shutter module 70 about the optical axis of the objective lens assembly 74. Also formed within the front wall 48 is an aperture 55 for admitting actinic radiation to the exposure chamber 56. The aperture 55 is surrounded by a forwardly extending rectangular flange 57 that telescopically receives a rearwardly extending correspondingly configured rectangular section 78 located on the rear wall 73 (See FIG. 7) of the shutter module 70. The mating of the flange 57 and the section 78 provides a light seal against unwanted ambient light for entering the exposure chamber 56. The shutter modules 70 is connected to the front wall 48 via a snap fastener connector. A rearwardly extending cantilevered lug type member 79 enters a complimentary configured slot 53 located in the front wall 48 (See FIG. 5) to complete the snap assembly.

Referring to FIG. 5, it is apparent that the rear wall 54 of the structural member 46 forms an acute angle with the plane 58. In this connection, the rear wall 54 may be provided with any suitable mirror for purposes of directing light rays from the lens to the film plane. This is required so that the image formed by the objective lens assembly 74 is properly oriented with respect to the film units 26.

Viewfinder module 90 lossely connects onto the shutter module 70 by an arrangement which locates it in a front to rear orientation with respect to the plane 58 but otherwise permits it to float vertically and laterally until it is positioned by an interfacing arrangement with the body 12 and the front cover 16. This latter arrangement will subsequently be explained. For the present, however, it should be pointed out that this particular scheme insures that the optical axes of the viewfinder 90 and the objective lens assembly 74 will be in proper alignment. With respect to the connection of the viewfinder module 90 to the shutter module 70, reference is made to FIGS. 4, 7 and 8. The viewfinder module 90 is seen to include a front rectangular section 91 from which laterally extend three fingers 92, 93 and 94. Shutter module 70 (See FIG. 7) has a recessed area defined by a horizontal shelf 97 formed of portions of a front wall 83 and the rear wall 73 and a vertical shelf 98 similarly formed. This recessed area is dimensioned to receive the front rectangular section 91 of the viewfinder 90. The three fingers, 92, 93 and 94, slide over the front wall 83 approximately half way up the vertical shelf 98 so that the front wall 83 is trapped between the rear surface of the forward finger 92 and the front surfaces of the two rearward fingers 93 and 94. Thus the two rearward fingers, 93 and 94, are disposed between the spacing separating the inner surfaces of the front wall 83 and the rear wall 73 of the shutter module 70. The spacing separating the finger 92 and the fingers 93 and 94 is equivalent to the thickness of the front wall 83. The vertical spacing between the outer edges of the fingers 93 and 94 is such that they fit, with some clearance, between a pair of vertically spaced apart ribs 99 located on the inner surface of the rear wall 73. Thus the view-finder 90 may move somewhat laterally or vertically but not front to rear.

Figure 8:
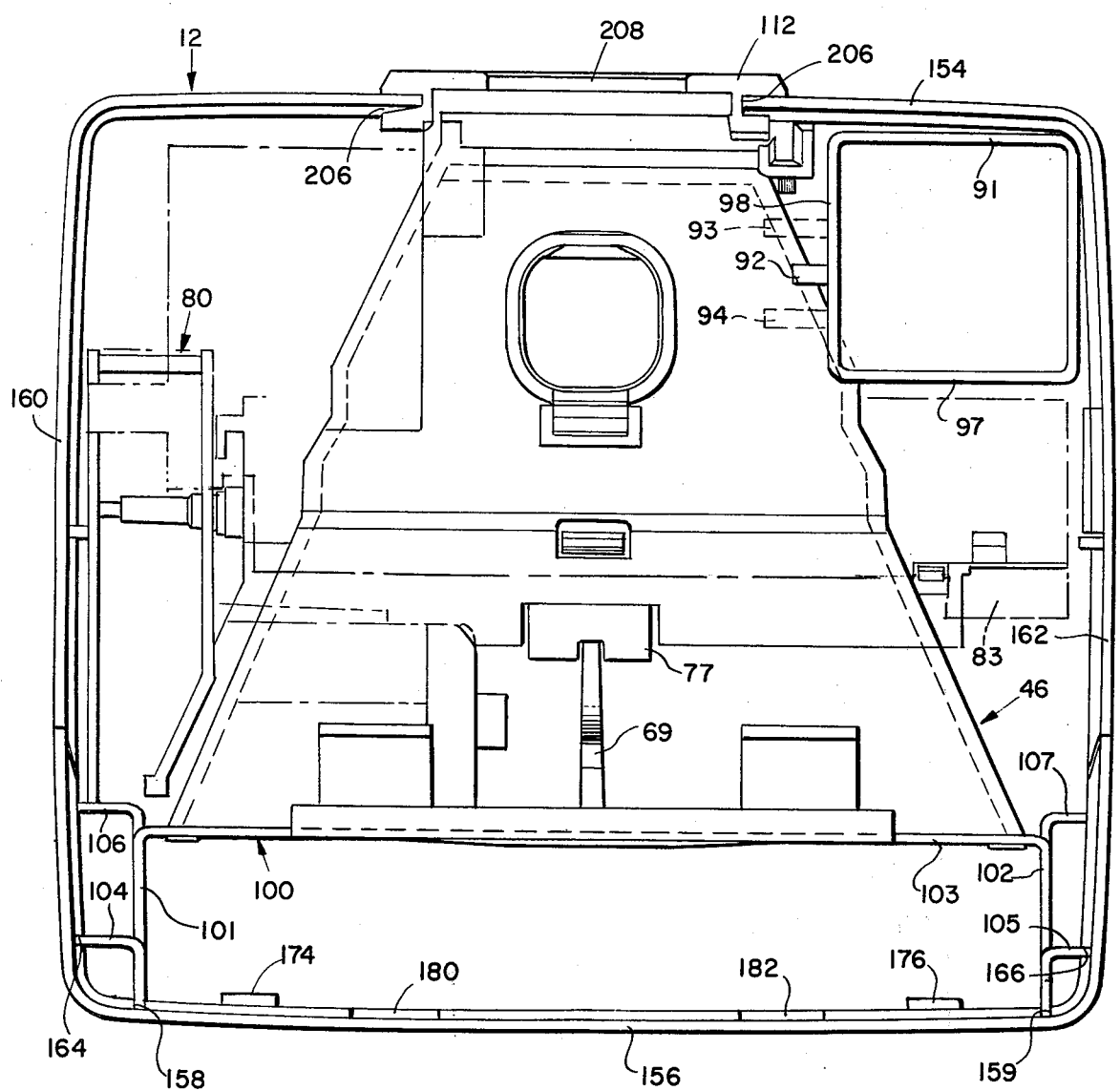
FIG. 8 is a diagrammatic front elevational view, with parts deleted, of the system of FIG. 1 shown with its front cover member and door housing removed.
Figure 9:
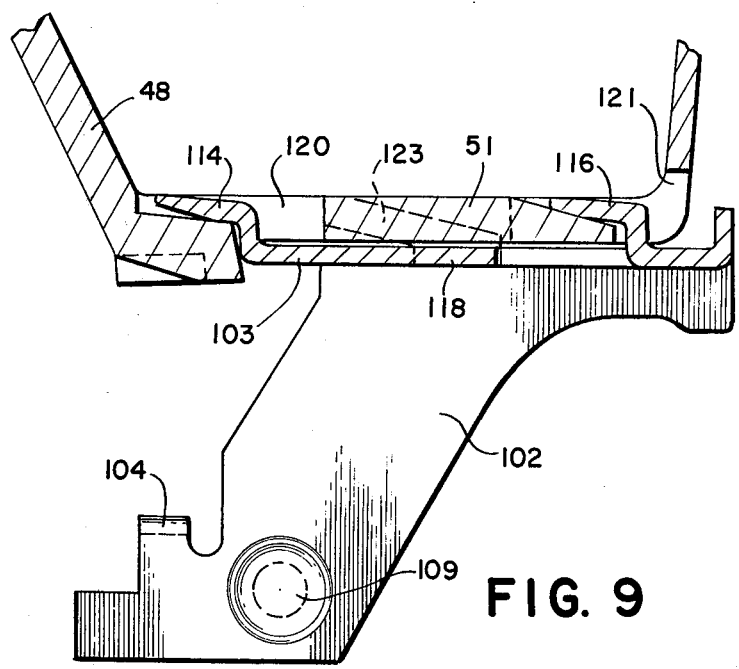
FIG. 9 is a side elevational sectional view illustrating the details of attaching a mounting bracket to the supporting structure of FIG. 4.

Mounting bracket 100 clips onto the shelf 51 also by a snap together arrangement but different than that previously described. The mounting bracket 100, referring to FIGS. 4, 8 and 9 is seen to include a pair of vertically spaced apart legs 101 and 102, connected by a horizontal shelf 103. Forming a part of each of the vertical legs, 101 and 102, are laterally extending tab sections 104, 105, 106 and 107. Also, each of the legs, 101 and 102, includes a hub 108 and 109, respectively.

From the shelf 103, there extend four angled tabs 114, 115, 116 and 117. Also formed in the shelf 103 is a locating hole 118 and an elongated slot 119. The shelf 51 includes four recesses complementary configured and spaced to correspondingly receive the angled tabs 114, 115, 116 and 117. These recesses include a first pair 120, 121 located on one side of the stiffening rib 69 and a similar pair located on the other side of the rib 69. The shelf 51 also includes a pair of spaced apart downwardly extending, flexible fingers 123 and 124. To attach the mounting bracket 100 to the shelf 51, the tabs 114, 115, 116 and 117 are inserted into the corresponding recesses 120 and 121. As the insertion continues, the fingers 123 and 124 enter the hole 118 and the slot 119, respectively, to locate the mounting bracket 100 to the shelf 51 and retain it in that position as a result of a force created by deflecting the flexible fingers 123 and 124 during attachment.

Once the mounting bracket 100 has been mounted on the shelf 51, door housing 18, which includes a pair of juxtaposed spreader rollers 130 and 131, attaches to the bracket 100 by snapping a pair of spaced apart mounting brackets 132 and 133 over the pivots 108 and 109. In this connection, the mounting brackets 132 and 133, each of which includes a hole, such as that designated as 134 in the bracket 132, that receives each of the pivots 108 and 109. This arrangement permits the door housing 18 to be rotatably moved from a latched position as shown in FIGS. 1 and 5 to an unlatched position (not shown) that permits the film cassette 20 to be inserted into the system 10. The details of this latching arrangement are explained extensively in U.S. application Ser. No. 502,161, filed on Aug. 30, 1974, by Andrew S. Ivester, et al. and entitled "Film Cassette Loading Door Latch and Interlock Switch For Photographic Apparatus." Briefly summarized though, a latching member 136 engages tab 106 as the housing 18 is rotated in a clockwise sense in FIG. 4. Located in an elongated slot 137 in the body 12 (FIG. 2) is a latch release button 138 which, when moved forward, engages latching member 136 to release the housing 18 for rotation.

The rollers 130 and 131 provide a film advance and processing function. To accomplish this, they are driven by the gear train module 80 which transfers energy from a motor 84 through a gearing arrangement whereby a drive gear 85 becomes engaged with a gear 135 driveably connected to the roller 130. Thus, it is important that the gear train module 80 and the door housing 18 are properly aligned so that this is accomplished. To insure this happens, the gear train module 80 and the door housing 18 have a common mounting point. This point is determined by section 106 on the mounting bracket 100. In addition, the gear train module 80 interfaces with the shutter module 70 and the film cassette 20. Because the gear train module 80 is multifunctional, i.e., it drives the roller 130, it advances the film units 26, and it includes a member 88 which interfaces with a switch (not shown) located in the shutter module 70, its spatial orientation is extremely important. Therefore, the mounting of the gear train module 80 will be examined in detail.

Referring to FIG. 4, the gear train module 80 is seen to include a forked section 87 located at its rear end, a slot 89 located at its front end and a section designated as 81, previously mentioned, located at the upper portion of side plate 82. These three items correspond to a three point mounting arrangement that locates the gear train module front to back, side to side, and up and down. Forked section 87 captures within its bight a platform section 140 located on the right rear lower corner of the structural member 46 (See FIG. 4). The module 80 is then rotated in a counterclockwise sense (viewed looking down at FIG. 4) until the tab 106 enters the slot 89. Further pressure against the module 80 after the tab 106 has entered the slot 89 causes a snap connector 86 (cantilevered type) to snap into the recess 123 formed in the shelf 51. As previously discussed, the snap connector 72 on the shutter module 70 engages the area 81 on the side plate 82.

The battery contacts 110 snap onto a pair of spaced apart vertical sections 142 (only one shown in FIG. 5) formed in the rear wall 54. Flash socket bonnet 112 slidably drops onto a vertically extending rectangular section 143 of the shutter module 70. Its function, as will be seen, is to provide a light seal and serve as a structural support for a linear flash bar for use with the system 10.

In summary, central system assembly 14 is constructed by connecting a group of function providing modules to a primary structural building block, the structural member 46, which, in addition to its own functions, serves as the unifying framework for the system assembly 14 by locating the various modules with respect to the plane 58 and each other. Upon completion of its assembly, the assembly 14 is an independently functioning unit capable of taking pictures, i.e., completing the system task, if it is assumed that the film cassette 20 can be retained against the plane 58 and, further, that no light leak problems are present. As such, the performance of the assembly 14 can be verified by appropriate testing techniques before further manufacture occurs. If a failure does occur at this stage, it is relatively easy to replace the defective module. With a more conventional design, the entire camera system usually needs to be assembled before its performance can be checked. consequently, the present invention provides a means of reducing scrap losses and labor costs that would normally be present in the traditional camera manufacturing operation.

Attention will now be directed to the way in which the asssembly 14 is mounted in the body 12. As indicated previously, assembly 14 and body 12 are mated by simply sliding the assembly 14 into the cavity formed by the interior portions of the body 12. This assembly is facilitated by an arrangement of structural interfaces between the assembly 14 and the body 12 which provide: (1) means for guiding the assembly 14 into the body 12 while the two are slidably mated; (2) means for spatially locating the assembly 14 within the body 12; and (3) means for supporting the assembly 14 within the body 12 such that the two cooperate to form a film cassette receiving chamber. Nevertheless the structural interface arrangement is quite straightforward. In effect, it amounts to a three point contact suspension system formed when three predetermined contact points formed within the cavity of the body 12 are slidably brought into engagement with three correspondingly configured points on the assembly 14. When the three correspondingly configured points are brought into contact, the assembly 14 is effectively suspended in cantilevered fashion with the body 12. The three points of the body 12 are integrally molded in the interior portions of the body 12 and are seen in FIGS. 2, 5 and 8. The first point is defined by a front surface 150 of a tab 152 which extends vertically downward from a top wall 154 of the body 12 (See FIGS. 2 and 5). The other two points are defined by a double pair of laterally spaced apart elongated slots. One pair is formed within a bottom wall 156 of the body 12 and are designated as 158 and 159 in FIG. 8. The other pair is formed within side walls 160 and 162 of the body 12 and are designated as 164 and 166 (See Fig. 8). The three points on the assembly 14 are defined by a rear surface 168 of the vertical tab 66 of structural member 46 (See FIGS. 2 and 5) and the bottom surfaces of the legs, 101 and 102, of the mounting bracket 100 and the two laterally extending tabs 104 and 105 of the mounting bracket 100. In this connection, the tabs 104 and 105 mate with the slots 164 and 166, respectively, and the bottom surfaces of the legs 101 and 102 mate with the slots 158 and 159, respectively (See FIG. 8). The rear surface 168 of the tab 66 contacts the front surface 150 of the tab 152 (See FIG. 5) to act as a stop and support for the upper part of the structural member 46. Referring to FIG. 5, it can be seen that this three point suspension arrangement positions the plane 58 of the structural member 46 above the botton wall 156 of the body 12 to define a film cassette receiving chamber 170. When the cassette 20 is inserted into the chamber 170, it is automatically positioned front to rear and side to side by the aprons 60 and 62 of the structural member 46. In order to continuously urge the cassette 20 vertically into the plane 58, and the bottom wall 156 of the body 12 is provided with a pair of spaced apart elongated ramps, 174 and 176, (See FIGS. 2 and 5) that create a slight interference between the bottom wall 156 and the plastic housing 22 of the film cassette 20. Because of the resiliency of the plastic housing 22, it, under compression, creates a force which continuously urges the film cassette 20 toward the plane 58. Also, in this connection, the battery contacts 110, create an additional biasing force against the film cassette 20 which additionally assist in keeping the cassette 20 pressed against the plane 58. Because of the sheer stiffness of the structural member 46, it experiences very little vertical deflection while under these aforementioned biasing forces, even with the three point cantilevered suspension of the assembly 14. To assist in removing the cassette 20 from the chamber 172, a series of laterally spaced apart ramps 178 (only one shows in FIG. 5) located at the base of the front wall 48 of the structural member 46 cam the cassette 20 out of the plane 58 when the cassette 20 is pulled forwardly. Body 12 also includes a pair of laterally spaced apart elongated slots 180 and 182 located on the bottom wall (See FIGS. 2 and 5) that serve to guide and locate the battery contacts 110 as the assembly 14 is slid into the body 12.

It will be recalled that the viewfinder module 90 is mounted to the shutter module 70 by an arrangment which permits the viewfinder module 90 to float vertically and laterally with respect to the shutter module but not front to rear. This arrangement permits the vertical and lateral alignment of the optical axis of the viewfinder module 90 with that of the objective lens assembly 74 by an interfacing arrangement between the body 12, the front cover 16, and the viewfinder module 90. The arrangement provides for alignment of the rear end of the viewfinder module 90 by an interface withe body while its front end is aligned by an interface with the front cover 16. In this connection, the body 12 includes a rearwardly extending tube 184 that is configured to slidably receive and compress a pair of flexible fingers 95 and 96 on the viewfinder module 90 so that its rear end is trapped by the walls of the tube 184. Also, the tube 184 includes a rearwardly extending elongated slot 186 that slidably receives a tab 188 located on the bottom of one of the flexible fingers 96 to guide and locate the rear end of the viewfinder module 90. The front end of the viewfinder module 90 is properly located when its front section 91 is received by a correspondingly configured flange 190 that surrounds a masking window 192 located in the front cover 16 (See FIG. 10). This mating of the section 91 and the flange 190 obviously occurs when the front cover 16 is snapped to the body 12.

The remaining parts of the body 12 will now be discussed before taking up the assembly of the front cover 16 to it.

The tube 184 is adapted to receive a flexible eye piece 194 which prevents the user from injuring his eye while viewing the scene. Also, located in a rear wall 196 (See FIG. 2) are a pair of spaced apart vertical ribs 198 and adjacent slots 199 (only one shown in FIG. 2 and FIG. 5) which provide a means for mounting a carrying strap. In the upper wall 154 is a recess 198 that is configured to receive the flash socket bonnet 112 when the assembly 14 is slid into the body 12. Surrounding the perimeter of the opening of the body 12 is a thin walled recessed flange section 200 (See FIG. 2) that is adapted to mate with correspondingly configured sections of the door housing 18, section 202 in FIG. 2, and the front cover 16, section 204 in FIGS. 2 and 10, in order to form a labyrinth type light seal which prevents ambient light from entering the enclosure defined by these components. In this connection, the flash socket bonnet 112 performs a similar function, communicating with both the recess 198 of the body 12 and a similarly configured recess 204 located on the front cover 16 (See FIG. 10). The flash socket bonnet, in this connection, includes a central slotted section 206 (See FIG. 8) into which the walls defining the recess 198 and 204 fit. This arrangement provides a light seal and allows a linear flash bar when inserted into an elongated slot 208, located in the top of flash socket bonnet 112, to electrically engage predetermined portions of the shutter module 70 for purposes of igniting such a flash bar.

Additionally, the body 12 includes a pair of laterally spaced apart recesses, 210 and 212, located in the side walls, 160 and 162, respectively, that are configured to receive a pair of correspondingly configured spaced apart flexible cantilevered type fingers, 214 and 216, (See FIG. 10) that project rearwardly from the front cover 16 and mate with said recesses to provide the snap connection between the body 12 and the front cover 16.

Figure 10:
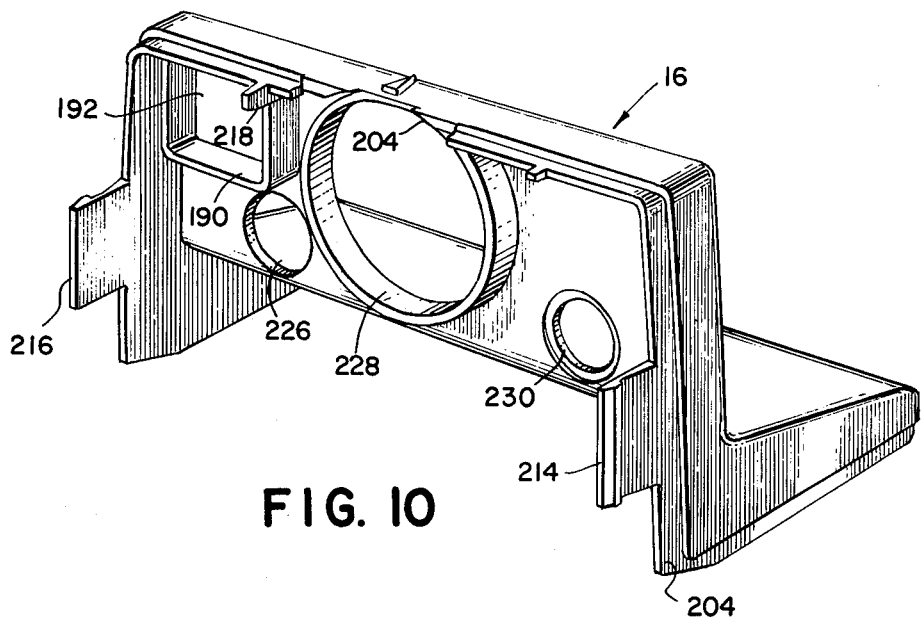
FIG. 10 is a diagrammatic rear perspective view of a front cover member of the system of FIG. 1.

Front cover 16 includes additional structural features that aid in retaining the assembly 14 within the body 12 when these two parts are snapped together. Referring to fig. 10, there will be seen a rearwardly extending projection 218 located near the top of the front cover 16. The function of projection 218 is to enter a correspondingly configured slot 220 (See FIG. 2) located on the front of the shutter module 70 when the front cover 16 is snapped to the body 12. This arrangement provides a force transmission path from the front cover 16 to the surface 150 located in the body 12 (See FIG. 5). In this way, the force created by the snap connection between the body 12 and the front cover 16 is transmitted, at least in part, to the front surface of the tab 66, thereby trapping the structural member 46 between the body 12 and the front cover 16. To enhance the magnitude of this force, a pair of laterally spaced apart flexible arms, 222 and 224, projecting forwardly from the shelf 51 of the structural member 46 (See FIGS. 2 and 5) engage the bottom of the flange 204 and are compressed thereby as the front cover 16 is snapped to the body 12. The force with which these compressed flexible arms, 222 and 224, resist is transmitted through the previously described force transmission path because it tends to rotate the front cover in a counterclockwise sense (FIG. 5) with the snap connectors acting as a point of rotation.

Additionally, the front cover 16 includes a series of apertures, through which preselected components of the shutter module 70 extend after the assembly 14 is enclosed by the body 12 and the front cover 16. These include a photometer aperture 226, an objective lens assembly aperture 228, and a system actuating button aperture 230 (See FIG. 10). The corresponding components in the shutter module 70 are a system actuating button 232 and the objective lens assembly 74 and a photometer not shown.

Those familiar with photographic arts will readily appreciate the novel and unique advantages inherent in this invention. Most importantly, a minimum cost fully automatic camera requiring at most only nominal assembly machinery has been provided.

This invention may be practiced or embodied in still other ways without departing from its spirit or essential character. The embodiment described herein is therefore illustrative and not restrictive, the scope of the invention being indicated in the appended claims and all variations which come within the meaning of the claims are intended to be embraced thereby.

What is claimed is:
1. A modular photographic camera comprising:
a plurality of modules each of which is adapted to perform a predetermined function, said plurality of modules including a viewfinder module having an optical axis and a shutter module including an objective lens assembly;
means for supporting said plurality of modules;
means for connecting said modules to said supporting means to define an operational system assembly having an optical axis coincident with the optical axis of said objective lens assembly;
a housing including a plurality of walls defining a chamber having an opening through which said operational system assembly may be inserted into said chamber, said housing including means cooperable with said operational system assembly during its insertion into said chamber for locating and supporting said operational system assembly within said chamber;
closure means connectable to said housing to close said chamber opening and substantially complete the enclosure of said operational system assembly when disposed within said chamber, said closure means including means for receiving and supporting at least part of said viewfinder module such that the optical axis of said viewfinder module is aligned, in part, with the optical axis of said objective lens assembly of said operational system assembly when said closure means is connected to said housing and said operational system assembly is disposed within said chamber; and means for connecting said closure means to said housing.

2. The camera of claim 1 wherein said closure means further includes means for forming a first masking aperture to define the field of view of said viewfinder module.

3. The camera of claim 2 wherein said closure means further includes means for forming a second aperture therein through which said objective lens assembly of said camera extends when said closure means is connected to said housing.

4. The camera of claim 3 wherein said closure means further includes means for forming a third aperture therein through which a photometer lens assembly extends when said closure means is connected to said housing.

5. The camera of claim 4 wherein said closure means further includes means for forming a fourth aperture therein for receiving and supporting a system actuating switch.

6. The camera of claim 1 wherein said closure means and said housing further include means providing a light seal to shield said operational system assembly from ambient light when said closure means is connected to said housing.

7. A modular photographic camera for use with a cassette of self-processable film units, said camera comprising:
a plurality of modules each of which is adapted to perform a predetermined function, said modules including a door housing module having means therein for processing a film unit,
means for supporting said modules;
means for connecting said modules to said supporting means to define an operational system assembly;
a housing including a plurality of walls defining a chamber having an opening through which said operational system assembly may be inserted into said chamber, said housing including means cooperable with said operational system assembly during its insertion into said chamber for locating and supporting said operational system assembly within said chamber, said housing further including means defining a cassette receiving cavity;
means for rotatably mounting said door housing module to said operational system assembly for movement with respect thereto between a first open position for loading a cassette into said cassette receiving cavity and a second closed position for retaining a cassette within said cassette receiving cavity;
closure means connectable to said housing to close said chamber opening and substantially complete the enclosure of said operational system assembly when disposed within said chamber; and
means for connecting said closure means to said housing.

8. The camera of claim 7 wherein said door housing module further includes means for providing a light seal cooperable with said housing and said closure means to shield film units from ambient light when a cassette is disposed within said system.

9. The system of claim 8 wherein said housing further includes means for actuating said door housing module to move it from said second closed position to said first open position.

10. A modular photographic camera for performing a series of photographic functions attendant to the consecutive exposure and processing of a plurality of self-processable film units contained in a cassette, said system comprising:
a. a first housing member formed of a plurality of thin wall sections including a bottom wall which define a chamber having an opening therein, said chamber being adapted to slidably receive through said opening an independently operational system assembly such that said operational system assembly may be easily inserted into and removed from said chamber, said chamber further including:
1. means for providing slidably connecting interfaces for locating and supporting said operational system assembly within said chamber when said operational assembly is brought into engagement therewith, and
2. connecting means for joining said first housing member to a cover member;
b. an independently operational system assembly including:
1. a structural member having interior portions that define the limits of an exposure chamber, exterior portions adapted to mountably receive a group of system modules, and means for forming a cassette mounting plane therein to establish a system film plane,
2. a group os system modules mounted to said exterior portions of said structural member, each of said modules providing predetermined system operating function, and
3. means for providing complimentary configured locating and supporting interfaces for engaging with said slidably connecting interfaces of said chamber and for spacing said cassette mounting plane from said bottom wall of said first housing member to form a cavity for receiving a cassette of film units;
c. a cover member for mating with said first housing member to complete the enclousre of said operational system assembly within said chamber such that said operational system assembly is retained within a protective outer shell formed by connecting said cover member to said first housing member, said cover member including;
1. connecting means configured to cooperate with said connecting means of said first housing member to provide for the assembly of said cover member to said first housing member, and
2. means for maintaining the engaged relationship between said locating and supporting interfaces of said chamber and said operational system assembly after said operational system assembly is inserted into said chamber.

11. The camera of claim 10 wherein said bottom wall of said first housing member further includes a pair of laterally spaced elongated slotted guides for slidably receiving a pair of battery contacts and retaining them in position within said cassette receiving cavity such that they are in position to make electrical engagement with the terminals of an electrical storage battery located in a cassette.

12. The camera of claim 10 wherein said structural member further includes means for defining the optical axis of said camera such that said optical axis forming means is the sole structural determinant of the spatial relationship between said objective lens and said cassette mounting plane.

13. A modular photographic camera for performing a series of photographic functions attendant to the consecutive exposure and processing of a plurality of self-processable film units contained in a cassette, said camera comprising:
   a. an independently operational camera assembly including:
      1. a group of camera modules each of which provides a predetermined camera operating function and including a viewfinder module having an optical axis, a shutter module including an objective lens assembly, and
      2. a structural member having interior portions that define the limits of an exposure chamber and exterior portions to which said modules are attached;
   b. a first housing member formed of a plurality of thin wall sections which define an open ended chamber adapted to slidably receive said independently operational camera assembly therein, said chamber and said independently operational camera assembly including, respectively, complimentary configured locating and supporting interface portions for engaging one another to position said independently operational camera assembly within said chamber in a predetermined orientation, said first housing member further including means for receiving and supporting at least part of said viewfinder module; and
   c. a cover member for mating with said first housing member to complete the enclosure of said independently operational camera assembly within said chamber such that said independently operational camera assembly is retained within a protective outer shell formed by connecting said cover member to said first housing member, said cover member and said first housing member each including complimentary configured connecting means for mating one to the other, said cover member further including means for maintaining the position of said operational system assembly within said chamber.

14. The camera of claim 13 wherein said means for receiving and supporting at least part of said viewfinder module further includes means for, in part, aligning the optical axis of said viewfinder module with the optical axis of said objective lens assembly of said camera.

15. A modular photographic camera for performing a series of photographic functions attendant to the consecutive exposure and processing of a plurality of self-processable film units contained in a cassette, said camera comprising:
   a. an independently operational camera assembly including:
      1. a group of camera modules each of which provides a predetermined camera operating function and including a viewfinder module having an optical axis and a shutter module including an objective lens assembly, and
      2. a structural member having interior portions that define the limits of an exposure chamber and exterior portions to which said modules are attached;
   b. a first housing member formed of a plurality of thin wall sections which define an open ended chamber adapted to slidably receive said independently operational camera assembly therein, said chamber and said independently operational camera assembly including respectively complimentary configured locating and supporting interface portions for engaging one another to position said independently operational camera assembly within said chamber in a predetermined orientation;
   c. a cover member for mating with said first housing member to complete the enclosure of said independently operational camera assembly within said chamber such that said independently operational camera assembly is retained within a protective outer shell formed by connecting said cover member to said first housing member, said cover member and said first housing member each including complimentary configured connecting means for mating one to the other, said cover member further including means for maintaining the position of said operational camera assembly within said chamber and means for receiving and supporting at least part of said viewfinder module such that the optical axis thereof is aligned with the camera optical axis when said cover member is connected to said first housing member.

16. The camera of claim 15 wherein said cover member further includes means for defining the field of view of said viewfinder module.

17. The camera of claim 16 wherein said cover member further includes means for forming a first aperture therein through which said objective lens assembly of said camera extends when said cover member is connected to said first housing member.

18. The camera of claim 17 wherein said cover member further includes means for forming a second aperture through which a photometer lens assembly extends when said cover member is connected to said first housing member.

19. The camera of claim 18 wherein said cover member further includes means for forming a third aperture therein for receiving and supporting a system operating switch.

20. The camera of claim 15 wherein said cover member and said first housing member further include means adpated to cooperate with each other to provide a light seal to shield said operational system assembly from ambient light when said cover member is connected to said first housing member.

21. A modular photographic camera for performing a series of photographic functions attendant to the consecutive exposure and processing of a plurality of self-processable film units contained in a cassette, said camera comprising:
   a. an independently operational camera assembly including:
      1. a group of camera modules each of which provides a predetermined camera operating function and including a door housing module having means thereon for processing a film unit, and
      2. a structural member having interior portions that define the limits of an exposure chamber and exterior portions to which said camera modules are attached, said structural member including means for, in part, forming a cassette receiving cavity within said camera and means for rotatably mounting said door housing module to said independently operational camera assembly for movement with respect thereto between a first open position for loading a cassette into said camera and a second closed position for retaining a cassette within said camera;

b. a first housing member formed of a plurality of thin wall sections, including a bottom wall, which define an open ended chamber adapted to slidably receive said independently operational camera assembly therein, said chamber and said independently operational camera assembly including, respectively, complimentary configured locating and supporting interface portions for engaging one another to position said independently operational camera assembly within said chamber in a predetermined orientation, said bottom wall and said structural member being positioned with respect to one another when said independently operational camera assembly is disposed within said chamber such that said means of said structural member for, in part, forming a cassette receiving cavity is spaced away from said bottom wall to provide a cavity for receiving a cassette; and c. a cover member for mating with said first housing member to complete the enclosure of said independently operational camera assembly within said chamber such that said independently operational camera assembly is retained within a protective outer shell formed by connecting said cover member to said first housing member, said cover member and said first housing member each including complementary configured connecting means for mating one to the other, said cover member further including means for maintaining the position of said independently operational camera assembly within said chamber.

22. The camera of claim 21 wherein said door housing module processing means includes a pair of juxtaposed drivable spread rollers adapted to receive a film unit and spread a processing fluid across an exposed area thereof as it is advanced between said rollers.

23. The camera of claim 22 wherein said door housing module further includes means for providing a light seal to shield film units from ambient light which may enter said camera.

24. The camera of claim 21 wherein said first housing member further includes means for actuating said door housing module to move it from said second closed position to said first open position.

25. A modular photographic camera comprising;
a. an independently operational system assembly having a forward and a read end and including:
1. a structural member adapted to mountably receive a group of system modules,
2. a group of system modules mounted to said structural member, and
3. means for providing for the cantilevered mounting of said operational system about said forward end thereof;
b. a housing member formed of a plurality of wall sections that form a chamber having a rear end and a forward opening therein defined by the edges of said wall sections, said chamber being adapted to slidably receive through said forward opening said operationsl system assembly, said chamber further including means located adjacent the periphery of said chamber opening for mating with said forwardly located cantilevered mounting means of said operational system assembly such that said rear end of said operational system assembly is located toward said rear end of said chamber without contacting the interior of said chamber; and c. a cover member for mating with said housing member to substantially complete the enclosure of said operational system assembly within said chamber such that said operational system assembly is retained within a protective outer shell formed by connecting said cover member to said housing, said cover member including means cooperable with said operational system assembly for maintaining the cantilevered mounting thereof while disposed within said chamber.

26. A modular photographic camera comprising:
a plurality of modules each of which is adapted to perform a predetermined function, said plurality of modules including a viewfinder module having an optical axis and a shutter module including an objective lens assembly;
means for supporting said plurality of modules;
means for connecting said modules to said supporting means to define an operational system assembly having an optical axis coincident with the optical axis of said objective lens assembly;
a housing including a plurality of walls defining a chamber having an opening through which said operational system assembly may be inserted into said chamber, said housing including means cooperable with said operational system assembly during its insertion into said chamber for locating and supporting said operational system assembly within said chamber and means slidably engageable with said viewfinder module for receiving and supporting at least part of said viewfinder module for, in part, aligning the optical axis of said viewfinder module with the optical axis of said operational system assembly when said operational system assembly is disposed within said chamber;
closure means connectable to said housing to close said chamber opening and substantially complete the enclosure of said operational system assembly when disposed within said chamber; and
means for connecting said clousre means to said housing.

27. A modular photographic camera for use with a cassette of film units of the type including a battery having terminals accessible through speced apart openings therein, said camera comprising:
a plurality of modules each of which is adapted to perform a predetermined function;
means for supporting said modules including means for forming a cassette mounting plane therein for establishing a camera film plane;
means for connecting said modules to said supporting means to define an operational system assembly;
a pair of battery contacts, attached to said supporting means,, for engaging the terminals of a cassette battery when a cassette is brought into operative relationship therewith;
a housing including a plurality of walls defining a chamber having an opening through which said operational system assembly may be inserted into said chamber, said housing including means cooperable with said operational system assembly during its insertion into said chamber for locating and supporting said operational system assembly within said chamber and a bottom wall including a pair of spaced apart elongated slotted guides for slidably receiving said pair of battery contacts as said operational system assembly is inserted into said chamber, said bottom wall and said supporting means being positioned with respect to each other when said operational system assembly is disposed within said cavity such that said cassette mounting plane is spaced away from said bottom wall to provide a cavity for receiving the cassette, and said spaced apart slotted guides retain said battery contacts within said cassette receiving cavity to retain said battery contacts in position to make contact with the battery terminals whenever a cassette is inserted into said cassette receiving cavity;

closure means connectable to said housing to close said chamber opening and substantially complete the enclousre of said operational system assembly when disposed within said chamber; and means for connecting said clousre means to said housing.

28. A self-developing photographic camera comprising:

a structural member;

a plurality of camera system modules mounted on said structural member, said plurality of camera system modules including a cassette loading door module connected to said structural member for pivotal movement between first and second positions with respect thereto and including a pair of juxtaposed spreader rollers and a housing member, a shutter module including an objective lens assembly and a gear train module in a position to be automatically coupled to at least one of said rollers for selectively driving said one roller when said cassette loading door module is disposed in its said first position;

a camera body defining an open ended cavity through which the assemblage comprising said structural member and said plurality of camera system modules is adapted to be slidably inserted with the end of said assemblage opposite said shutter module entering said cavity first, said assemblage and said camera body including complementary means respectively positioned thereon for establishing and maintaining a predetermined orientation of said assemblage with respect to said camera body during the insertion of said assembly into said camera body; and a front cover having an aperture to facilitate its positioning over said shutter module with at least a portion of said objective lens assembly extending through said aperture, said front cover being structured to mate with said camera body and, when said cassette loading door module is disposed in its said first position, with said housing member to define a substantially enclosed camera housing, said camera body and said front cover including complementary means respectively positioned thereon for connecting said front cover to said camera body when said front cover is mated to said camera body.

29. The camera of claim 28 wherein said complementary connecting means comprise complementary snap-fit connections structured to automatically connect said front cover to said camera body when said front cover is mated to said camera body.

30. The camera of claim 29 wherein said front cover and its respective said connecting means consist of an integrally molded plastic member, and said camera body and its respective said connecting means consists of an integrally molded plastic member.

31. The camera of claim 28 wherein said camera body additionally includes means for restricting the extent to which said assemblage can be inserted into said camera body and said front cover is structured to engage said assemblage and resiliently urge said assemblage against said restricting means when said front cover is mated to said camera body.

32. The camera of claim 31 wherein said restricting means on said camera body and the portions of said assemblage urged thereagainst in combination define a three point suspension system adjacent to the open end of said cavity serving to position a major portion of said assemblage within said camera body in spaced apart relationship to said camera body.

33. The camera of claim 32 wherein said camera includes a mounting bracket connected to said structural member, said cassette loading door module being pivotally connected to said mounting bracket, and wherein two of said assemblage portions are located on said mounting bracket and the third of said assemblage portions comprises a section of said structural member, said shutter module comprising a tab serving to press said structural member section against an adjacent section of said restricting means of said camera body when said front cover is mated to said camera body.

34. The camera of claim 32 wherein said structural member defines at least a major portion of an exposure chamber.

35. The camera of claim 31 wherein said plurality of camera system modules additionally includes a viewfinder module and said cavity includes first and second communicating discrete sections, said first cavity sections being structured to receive a substantial portion of said structural member and said second cavity section being structured to slidably, receive a substantial poriton of said viewfinder module said viewfinder module and said camera body including complementary means respectively positioned thereon for atuomatically operatively aligning said viewfinder module within said camera body when said assemblage is seated against said restricting means.

36. A self-developing photographic camera comprising:

a photographically operational subassembly including means for defining an exposure chamber, a shutter module including an objective lens assembly, a film advance mechanism and a cassette loading door module mounted on said subassembly for pivotal movement between a first position and a second position, said cassette loading door module including a pair of juxtaposed spreader members arranged to operably receive, when said cassette loading door module is in its said first position, a film unit advanced by said film advance mechanism and a housing member;

a camera body defining an open ended cavity through which said subassembly is adapted to be slidably inserted with the end of said subassembly opposite said shutter module entering said cavity first, said subassembly and said camera body including complementary means respectively positioned thereon for establishing and maintaining a predetermined orientation of said subassembly with respect to said camera body during insertion of said subassembly into said camera body; and a front cover having an aperture to facilitate its positioning over said shutter module with at least a portion of said objective lens assembly extending through said aperture, said front cover being structured to mate with said camera body and, when said cassette loading door module is disposed in its said first position, with said housing member to define a substantially enclosed camera housing, said camera body and said front cover including complementary means respectively positioned thereon for connecting said front cover to said camera body when said front cover is mated to said camera body.

37. A modular photographic camera for use with a cassette fo film units, said camera comprising:
 a plurality of modules each of which is adapted to perform a predetermined function, said modules including a shutter module having an objective lens assembly;
 means for supporting said modules including means for forming a cassette mounting plane within said camera for establishing a camera film plane, said supporting means further including means for defining an optical axis of said camera such that said optical axis forming means is the sole structural determinant of the spatial relationship between said objective lens assembly and said cassette mounting plane;
 a housing including a plurality of wall sections, including a bottom wall section, defining an opening through which said operational system assembly may be inserted into said chamber, said housing including means cooperable with said operational system assembly during its insertion into said chamber for locating and supporting said operational system assembly within said chamber such that when said operational system assembly is disposed within said chamber said cassette mounting plane is spaced away from said bottom wall to provide, in cooperation therewith, a cavity for receiving a cassette;
 closure means connectable to said housing to close said opening and substantially complete the enclosure of said operational system assembly; and
 means for connecting said closure means to said housing.

* * * * *